B. R. BENJAMIN.
CORN HARVESTER.
APPLICATION FILED DEC. 8, 1915.
1,282,031.
Patented Oct. 22, 1918.
2 SHEETS—SHEET 2.
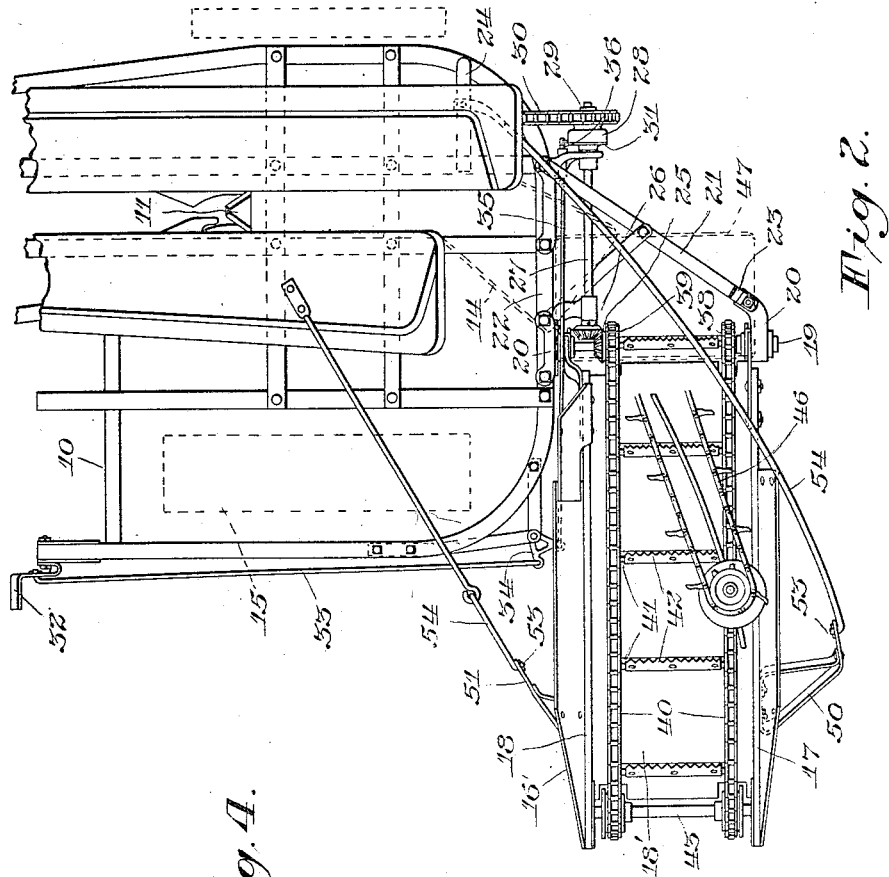
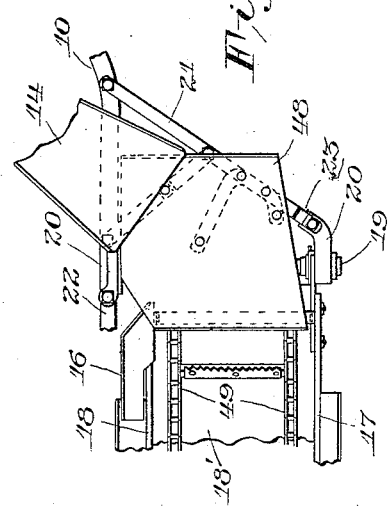
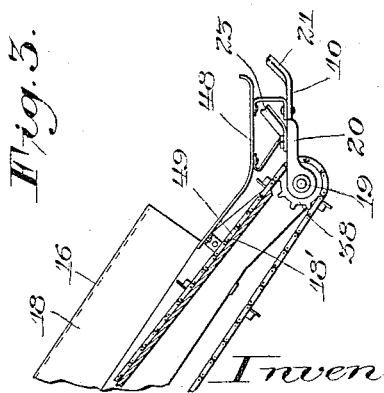
Inventor.
Bert R. Benjamin,
By Chas. E. Lord
Atty.

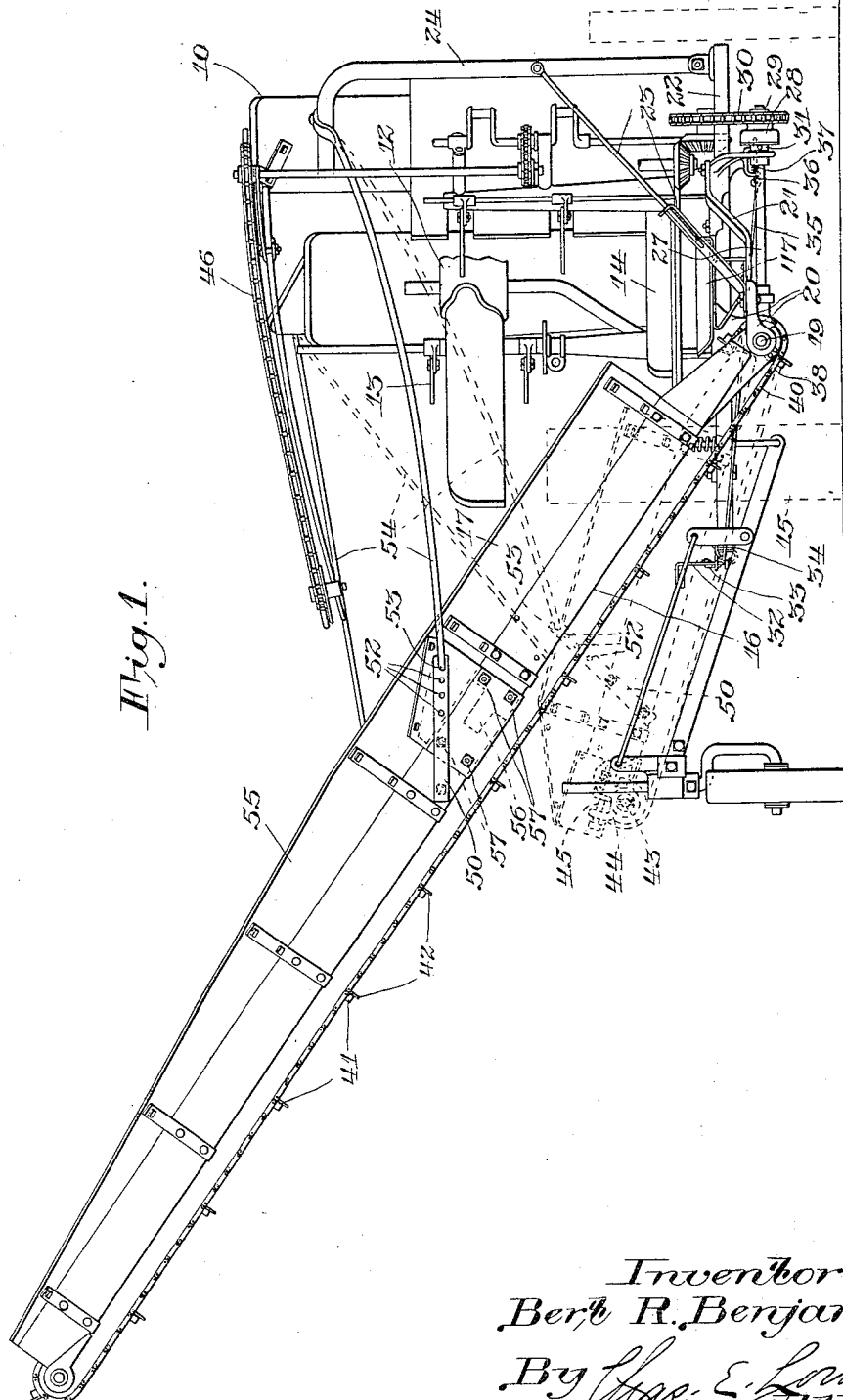

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

CORN-HARVESTER.

1,282,031.	Specification of Letters Patent.	Patented Oct. 22, 1918.

Application filed December 8, 1915. Serial No. 65,693.

*To all whom it may concern:*

Be it known that I, BERT R. BENJAMIN, a citizen of the United States, residing at Oak Park, in the county of Cook and State of Illinois, have invented certain new and useful Improvements in Corn-Harvesters, of which the following is a full, clear, and exact specification.

This invention relates to corn harvesters, and more particularly to means for conveying bundles formed in such machines.

Various types of bundle carriers have been provided for receiving bundles from the binding mechanism and depositing them on the ground. The most recent types insure the proper placement of the bundles beyond the path of travel of the third draft horse. Some farmers choose to dump the bundles on the ground by the use of a bundle carrier. Other farmers desire to have an elevator attached to the harvester to elevate bundles directly from the machine onto a wagon drawn at the side thereof. Very few do both because of the expense incurred in purchasing both a bundle carrier attachment and an elevator attachment.

Primarily, therefore, it is the object of my invention to accomplish the functions of both a bundle carrier and an elevator by a simple, durable and relatively inexpensive means.

Another object is to improve the transferring of bundles from the binding mechanism to the bundle carrier or elevator.

Another object is to cause a positive uninterrupted feeding of the bundles from the binding mechanism to the carrier and an intermittent action of the carrier to dump the bundles at desired intervals.

Another object is to provide a bundle carrier and elevator equipment for a corn harvester adapted to meet all of the requirements for successful commercial operation.

These and other objects are accomplished by providing, in combination with a corn harvester, a combination or convertible bundle carrier and elevator, means for positively and uninterruptedly feeding bundles from the binding mechanism to the carrier or elevator in a manner to prevent clogging at the foot of the same, means for controlling the intermittent action of the carrier or elevator, and adjustable means for changing the inclination of the carrier and elevator.

The invention is illustrated on the accompanying sheets of drawings, in which—

Figure 1 is a rear elevation of a corn harvester equipped with my convertible bundle carrier and elevator shown in side elevation;

Fig. 2 is a fragmentary plan view of the same harvester with the bundle carrier attachment secured thereto;

Fig. 3 is a fragmentary sectional view of the lower portion of the bundle carrier showing modified means, or a pan, adjacent and covering in part the lower portion of the carrier chain to prevent clogging at the foot of the carrier and to act as a spacer between the binding mechanism and the chain or movable element of the bundle carrier; and Fig. 4 is a plan view of the same.

The various novel features of my invention will be apparent from the following description and drawings, and will be particularly set forth in the appended claims.

The corn harvester 10 here shown is one of a standard type, having the usual cutting mechanism 11, binding mechanism 12 and bundle discharge mechanism 13, the usual adjustable butts chute 14 extending rearwardly and grainwardly at the rear of the harvester. The various parts of the harvester to be driven receive their power from the bull wheel 15 in the usual manner.

Bundle carriers which receive bundles from the binding mechanism and deposit them upon the ground beyond the path of travel of the third draft horse, and also bundle elevators for elevating bundles from the binding mechanism to a suitable wagon drawn at the side thereof, are recognized necessities for successful farming. Few farmers, however, use both because of the expense incurred in purchasing the same. I have solved this problem by providing, in combination with a corn harvester, a convertible bundle carrier and bundle elevator which, in one adjustment, is capable of receiving bundles from the binding mechanism and depositing the same on the ground in a desired manner, and in another adjustment for receiving the bundles from the binding mechanism and elevating the same for loading purposes. For the sake of clearness, the bundle carrier of the convertible structure will be described first.

The bundle carrier includes a frame 16, having side portions 17 and 18 and a bottom 18¹. The carrier is pivotally mounted at its lower end upon a shaft 19 mounted in bearing portions 20 of a triangular frame member 21, which is secured to the rear cross frame member 22 of the harvester, an adjustable brace connection 23 being provided between the rearward end of said triangular frame 21 and a supporting post 24 forming a part of the harvester structure. Mounted upon the shaft 19 for driving purposes is a bevel gear 25 driven by a bevel gear 26 mounted upon one end of a suitably supported shaft 27, upon the other end of which is rotatably mounted a clutch member 28 driven through a sprocket 29 and chain 30 from any suitable driving source. Secured to the shaft 27 is a clutch member 31, having the usual internal clutch dogs, which normally are out of engagement with the movable clutch member, but which may be thrown into engagement with the movable clutch member 28 by depressing a foot lever 32, which is operatively connected to the clutch member 31 through a link 33, bell crank lever 34, link 35, and a plunger 36, which is acted upon by a spring 37 normally to maintain the clutch members 31 and 28 out of engagement with each other. Also mounted on the shaft 19 are two sprocket wheels 38 and 39, over which pass chains 40 forming a part of the movable element of the bundle carrier. These chains are connected by cross members 41 having teeth 42 for positively engaging the bundles for conveying the same over the stationary element of the carrier and depositing said bundles in proper position upon the ground. The chains 40 also pass over suitable sprocket wheels mounted upon a shaft 43 at the outer end of the carrier and which is journaled in a bearing bracket 44 which may be adjusted with respect to the stationary element of the conveyer by a screw 45 for varying the tautness of the conveyer chains. By means of this arrangement it is seen that when the bundles formed by the binding mechanism are discharged therefrom, the same are thrown onto the bundle carrier, which normally is at a state of rest. However, the operator may cause the movable element of the bundle carrier to be actuated at any time by merely depressing the foot lever 32, which throws the clutch member 31 into contact with the actuating clutch member 28.

Experience has taught that when corn is being bound and discharged from the binding mechanism to the bundle carrier or elevator, especially in tangled corn conditions, some means must be provided for positively feeding the heads of the bundles from the binding mechanism to the bundle carrier or elevator. If such positive feeding mechanism is not provided, it is found, especially in tangled corn conditions, that some of the heads of the stalks of the bundle being discharged from the binding mechanism will extend over and be tangled with the heads of stalks being bound by the binding mechanism, with the result that the head of the bundle discharged from the binding mechanism will be retarded in its movement toward the bundle carrier, and in some cases will be held in a position intermediate the binding mechanism and the carrier, resulting in an undesirable clogging at or near the foot of the carrier or elevator. To overcome this undesirable feature, a chain 46 is provided for positively engaging the heads of the bundles as they are discharged from the binding mechanism and feeding the same directly to the movable conveyer member of the bundle carrier or elevator. This chain may be supported and driven in any suitable manner from any suitable source of power, the chain, however, being operated continuously. By means of this chain, therefore, the heads of the bundles which are discharged from the binding mechanism are positively carried over to the bundle conveyer in a manner to overcome any tangling which might occur.

There is one other point to be considered seriously in connection with transferring bundles from the binding mechanism to the bundle carrier or elevator, and that is that the butt ends of the bundles must not pass into engagement with the movable element of the bundle conveyer too soon. By experience it has been found that bundles, which are discharged from the binding mechanism, pass to the bundle carrier or elevator in such a way that the butt ends of the bundles engage the movable element too soon, causing said butt ends to be conveyed laterally while the head ends of the bundles tend to lag, and in some cases to such an extent that the bundles will pass laterally over the carrier or elevator butt ends foremost. Not only this, but when such is the case, the heads of the bundles fall down in and around the foot of the conveyer in a manner to clog the same. In order to overcome this undesirable feature, I have provided, intermediate the butts chute 14 and the movable element of the bundle carrier or elevator, a suitably supported spacing plate or pan 47, upon which the butt ends of the bundles fall when discharged from the binding mechanism, said pan extending slightly over the chains 40 and keeping the butt ends of the bundles out of engagement with the movable element of the carrier or elevator until the heads of the bundles are placed upon and actuated by said movable element. In other words, this pan 47 has a delaying or retarding action so far as the butt ends of the bundles passing into engagement with the movable element of the conveyer is concerned. This spacing pan 47 also acts as means to prevent clogging of material at or near the foot of the carrier or elevator.

In Figs. 3 and 4 a modified form of pan 48 is shown, which pan extends to a greater extent over the movable element 49 of the conveyer for the purpose of preventing the butt ends of the bundles from passing into engagement with the movable element 49 until the heads of the bundles have been swung around into engagement with said movable element. It is seen that in both cases the spacing pans 47 and 48 are intermediate the butts chute 14 of the binder and the movable element of the conveyer.

In practice, usually three bundles are permitted to be accumulated on the carrier before the operator depresses the foot lever 32 to throw the clutch member 31 into contact with clutch member 28 for operating the movable element of the carrier or elevator. In other words, the action of the carrier is intermittent and controlled entirely by the operator. On the other hand, the chain 46 for positively transmitting the heads of the bundles from the binding mechanism to the movable element of the carrier or elevator is in operation continuously during the forward movement of the harvester. If a motor were placed on the harvester for driving the parts thereof, said chain 46 would be operating continuously whether or not the harvester was being moved forwardly. The bundle carrier may be adjusted about its pivotal axis on the shaft 19 for the purpose of changing its inclination or raising or lowering the same to meet requirements, the same being accomplished by providing two brackets 50 and 51 on either side of the carrier frame, said brackets being provided with a plurality of openings 52 for the reception of the bent ends 53 of suitable supporting rods 54 connected to the frame of the harvester. Any other suitable adjusting means may be used for raising or lowering the bundle carrier.

Thus far attention has been given particularly to the bundle carrier arrangement of the convertible carrier and elevator. The carrier may be converted into an elevator by connecting to the outer end of the carrier another section 55 by any suitable means, such as by interconnected dovetailed portions 56 and suitable securing bolts 57. When the convertible carrier and elevator is arranged for elevating purposes the brackets 50 and 51 are removed from the lower section of the bundle carrier side portions and secured to the outer or elevator section, as shown by full lines in Fig. 1. Again, the bundle elevator may be raised and lowered about its pivotal axis or shaft 19 by having the ends 53 of the supporting rods 54 engage different ones of the apertures 52 in said brackets. Of course, when the convertible bundle carrier and elevator is changed from a bundle carrier to an elevator, a longer chain or movable element than is used in the carrier is provided which will be sufficiently long to extend over the full length of the elevator.

By means of this convertible bundle carrier and elevator, a farmer may use the same as a bundle carrier or elevator and change to one or the other with the expenditure of a very small amount of time, and at the same time have a simple, compact, durable and inexpensive attachment for his corn harvester. The other features above enumerated coöperate to make the operation of the combined unit successful under all conditions of operation.

It is evident that there may be various modifications of the invention herein shown and described, and it is my intention to cover all such modifications which do not involve a departure from the spirit and scope of my invention as set forth in the following claims.

What I claim as new is:

1. In combination with a corn harvester binding mechanism, a bundle carrier associated therewith and having a movable element, means for operating said movable element intermittently, and means for engaging the heads of the bundles when discharged from the binding mechanism of the harvester for positively feeding the same to said movable element.

2. In combination with a corn harvester binding mechanism, a bundle carrier associated therewith and having a movable element, means for operating said movable element intermittently, means for engaging the heads of the bundles when discharged from the binding mechanism of the harvester for positively feeding the same to said movable element, and means for adjusting the position of the carrier.

3. In combination with a corn harvester binding mechanism, a pivotally mounted bundle carrier associated therewith and having a movable element, means for operating said element intermittently, means for changing the inclination of said carrier, and means continuously operating during the progressive movement of the harvester for engaging the heads of bundles discharged from the binding mechanism of the harvester and feeding the same to said movable element.

4. In a harvester, binding mechanism including bundle discharging means, a movable bundle conveyer disposed in position to receive the bundles discharged from said binding mechanism, and stationary retarding and bridging means between the binding mechanism and the conveyer and located over the receiving end of said conveyer and in the path of the butts of the sheaves for retarding the passage of the butts to said conveyer.

5. In combination, binding mechanism including bundle discharging means, a bundle conveyer disposed in position to receive the bundles discharged from said binding mechanism, a bridging and retarding plate between the binding mechanism and said conveyer and located over the receiving end of said conveyer and in the path of the butts of the sheaves for retarding the passage of the butts to said conveyer, and means for positively feeding the heads of the bundles to said conveyer.

6. In combination, binding mechanism including bundle discharging means, a movable bundle conveyer disposed in position to receive the bundles discharged from said binding mechanism, a stationary bridging and retarding member between the binding mechanism and said conveyer located over the receiving end of said conveyer and in the path of the butts of the sheaves for retarding the movement of the butts to said conveyer, and means located above said plate and overlapping said binding mechanism for positively feeding the heads of the bundles while the butts thereof are being retarded by said stationary member.

7. In combination, binding mechanism, a bundle carrier having a movable element disposed in position to receive the bundles from said binding mechanism, means for operating said bundle carrier intermittently, means for discharging bundles from said binding mechanism onto said carrier, and bridging and retarding means intermediate the binding mechanism and the movable element of said carrier and disposed over the receiving end of said carrier for engaging the butts of the bundles, thereby preventing the butts from engaging with said movable element before the heads of the bundles pass into engagement therewith.

In testimony whereof I affix my signature.

BERT R. BENJAMIN.

Copies of this patent may be obtained for five cents each, by addressing the "Commissioner of Patents, Washington, D. C."